United States Patent [19]
Morimoto

[11] Patent Number: 5,127,603
[45] Date of Patent: Jul. 7, 1992

[54] FISHING REEL WITH COVER FOR ENCLOSING CONTROL DIAL

[75] Inventor: Shinichi Morimoto, Sakai, Japan
[73] Assignee: Shimano Industrial Co., Ltd., Osaka, Japan
[21] Appl. No.: 624,358
[22] Filed: Dec. 7, 1990

[30] Foreign Application Priority Data

Dec. 13, 1989 [JP] Japan .................. 1-144368[U]

[51] Int. Cl.⁵ .............................................. A01K 89/015
[52] U.S. Cl. ................................. 242/279; 242/310; 242/313
[58] Field of Search ............... 242/310, 312, 313, 314, 242/323, 288, 278, 279, 280

[56] References Cited

U.S. PATENT DOCUMENTS

| | | | |
|---|---|---|---|
| 175,227 | 3/1876 | Winans et al. | 242/313 X |
| 1,469,649 | 10/1923 | Sinkula et al. | 242/310 X |
| 2,170,186 | 8/1939 | Catron | 242/310 X |
| 2,327,431 | 8/1943 | Jicha | 242/313 |
| 2,593,748 | 4/1952 | Goldberg | 242/313 X |
| 4,434,951 | 3/1984 | Nakajima | 242/288 |
| 4,572,454 | 2/1986 | Furomoto | 242/288 |
| 4,593,866 | 6/1986 | Moosberg et al. | 242/314 X |
| 4,722,491 | 2/1988 | Myojo | 242/313 X |
| 4,728,052 | 3/1988 | Yeh | 242/323 X |
| 4,750,684 | 6/1988 | Morimoto | 242/310 |
| 4,821,978 | 4/1989 | Kaneko | 242/310 |
| 4,830,308 | 5/1989 | Puryear | 242/288 |

FOREIGN PATENT DOCUMENTS 62869 4/1983 Japan .................. 242/288
63-107173 7/1988 Japan .

Primary Examiner—Katherine Matecki
Attorney, Agent, or Firm—Dickstein, Shapiro & Morin

[57] ABSTRACT

A fishing reel comprises right and left side cases, a spool disposed between the side cases, a handle disposed adjacent one of the side cases for taking up a fishing line, and a cover openable and closable for covering an outer lateral region of the other side case. The cover extends to a lower position of the other side case and includes a bulge swelling out at an intermediate position between an upper position and a lower edge.

5 Claims, 4 Drawing Sheets

FISHING REEL WITH COVER FOR ENCLOSING CONTROL DIAL

BACKGROUND OF THE INVENTION

1. FIELD OF THE INVENTION

The present invention relates to fishing reels, and more particularly to a fishing reel comprising right and left side cases, a spool disposed between the side cases, a handle disposed adjacent one of the side cases for taking up a fishing line, and a cover openable and closable for covering an outer lateral region of the other side case.

2. DESCRIPTION OF THE PRIOR ART

A conventional cover openable and closable for covering side cases is disclosed in Japanese Utility Model Publication Kokai No. 63-107173, for example. In this publication, the cover is shaped to cover tops and lateral portions of right and left side cases and is switchable between an open position and a closed position by pivoting on a transverse axis disposed at a forward position of the reel.

Generally, a fishing reel includes a handle on the righthand side case. When this type of reel is attached to a fishing rod, the reel and rod are handled such that, for winding up the fishing line, the angler usually holds the reel handle with his right hand and the rod and reel with his left hand at the same time.

Holding the rod and reel with the left hand is called palming since part of the reel fits in the palm. With the palming, the outer surface of the left side case of the reel contacts the palm of the left hand.

However, the conventional fishing reel includes a dial and other elements on the outer surface of the left side case for adjusting a brake applied to rotation of the spool. In addition, this outer surface is partly recessed for fitting the dial and the like. During the above-mentioned palming, the dial and the like as well as sharp parts of the uneven surface contact the angler's palm. Not only does this contact give an unpleasant feeling but the dial could be operated inadvertently.

Further, the reel disclosed in the above publication has splits in the outer surfaces of the side cases for separating the cover and a reel body. The slight level difference produced by the split when the cover is closed may also give an unpleasant feeling to the angler.

SUMMARY OF THE INVENTION

A first object of the present invention is to provide a fishing reel which does not give an unpleasant feeling to the angler despite the uneven outer surface of a side face due to inclusion of a dial and the like.

A second object of the present invention is to provide a fishing reel which may be held securely during palming.

In a first aspect of the present invention, a fishing reel comprises side cases, a spool and a handle as noted in the outset hereof, wherein the cover extends to a lower position of one of the side cases and includes a bulge swelling out at an intermediate position between an upper position and a lower edge thereof.

According to this construction, the cover extending to a lower position of the side case maintains a dial and screws attached to the side case out of contact with the angler's palm during "palming". Moreover, since a bulge is formed in an intermediate portion of the cover, the palm contacting the bulge during "palming" does not contact the lower edge of the cover, and so the angler feels no sense of ruggedness. Since a pressure is applied from the palm to positions adjacent the bulge of the cover, the palm is not pressed hard against the brake adjusting dial even if the dial is exposed from the edge of the cover, for example.

According to the present invention, therefore, a streamlined fishing reel is provided which is free from an inadvertent operation of the dial and an unpleasant feeling given to the angler even if the side case presents an uneven outer surface due to the presence of the dial and the like.

In a second aspect of the present invention, the side case includes a curved portion under a lower edge of the cover to continue smoothly with a curved outer surface of the cover. According to this construction, even if the lower edge of the cover does not lie in the same level as the lower end of the side case, the palm may be placed in tight contact with the cover during "palming". This is possible in that, with the palm contacting the bulge of the cover and fingertips extending straight under the fishing rod, the palm is pressed on the lower edge of the cover under a weak force and the bulge contacts a dimpled central portion of the palm. Thus, a secure grip is made during the palming.

Further, according to the present invention, the cover may be shaped to define a gentle curve over to an upper surface of the side case as shown in the drawings. This construction prevents the palm from contacting control and other devices provided on the upper surface of the side case, and at the same time promotes "intimacy" with the palm to further facilitate the palming.

In a fourth aspect of the present invention, at least an upper portion of the dial is covered by the cover, the remaining portion of the dial being covered by the side case, and the side case includes a curved portion under a lower edge of the cover to continue smoothly with a curved outer surface of the cover.

According to this construction, the dial is not exposed when the cover is closed, to avoid an inadvertent operation of the dial. Further, the angler has a feeling of fitness since the side case includes a curved portion under the lower edge of the cover to continue smoothly with the curved outer surface of the cover.

Where the dial is entirely covered by the cover in the closed position, the dial is not exposed to avoid an inadvertent operation of the dial.

Other objects, features and advantages of the present invention will be apparent from the following description of the preferred embodiments.

BRIEF DESCRIPTION OF THE DRAWINGS

The drawings show fishing reels according to the present invention, in which.

DESCRIPTION OF THE PREFERRED EMBODIMENTS

Figure 1:
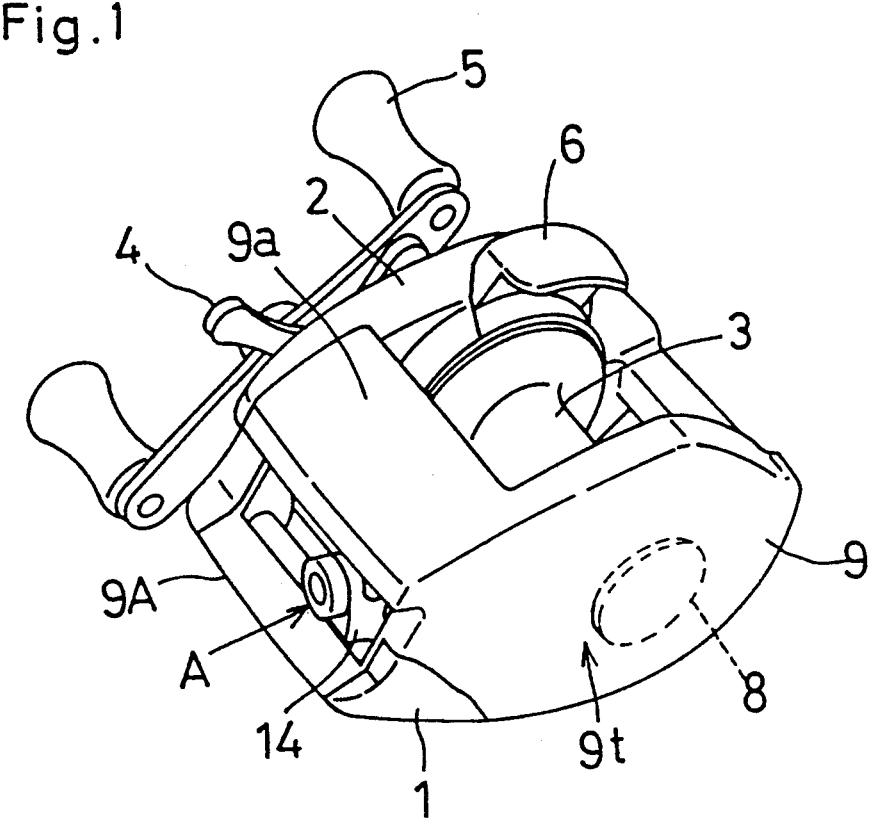
FIG. 1 is a perspective view of a fishing reel in a first embodiment.
Figure 2:
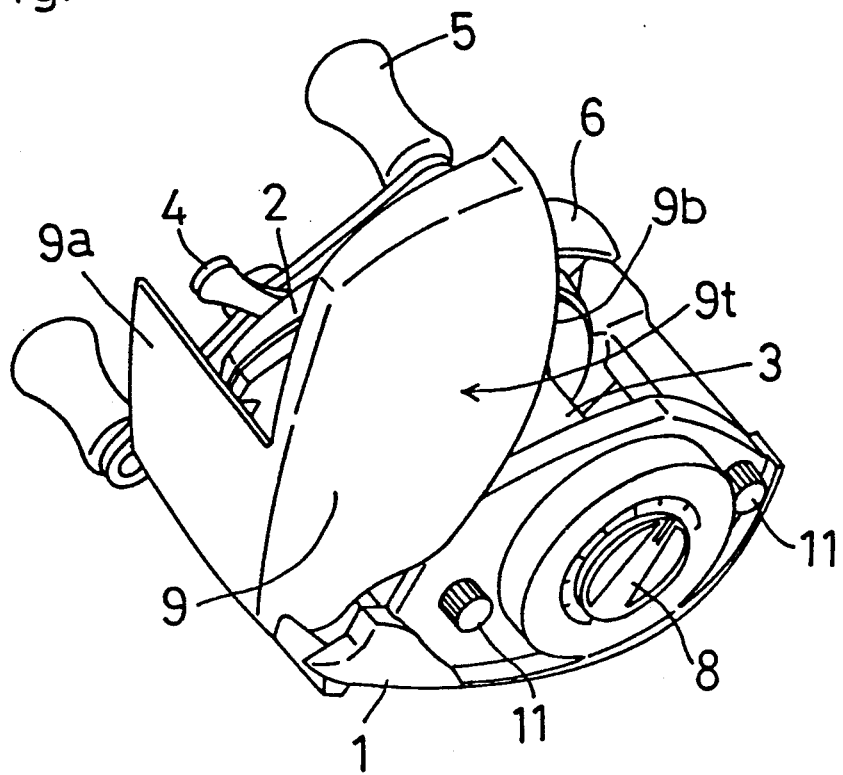
FIG. 2 is a perspective view of the reel with a cover opened.

A first embodiment of the present invention will be described hereinafter with reference to FIGS. 1 through 5.

A fishing reel comprises right and left side cases 1 and 2, a spool 3 extending between the side cases 1 and 2 for taking up a fishing line (not shown), and a level wind mechanism A for guiding the fishing line to the spool 3. The reel includes a drag adjuster 4 disposed outside the right side case 2, and a handle 5 also disposed outside the right case 2 for turning the spool 3.

Figure 3:
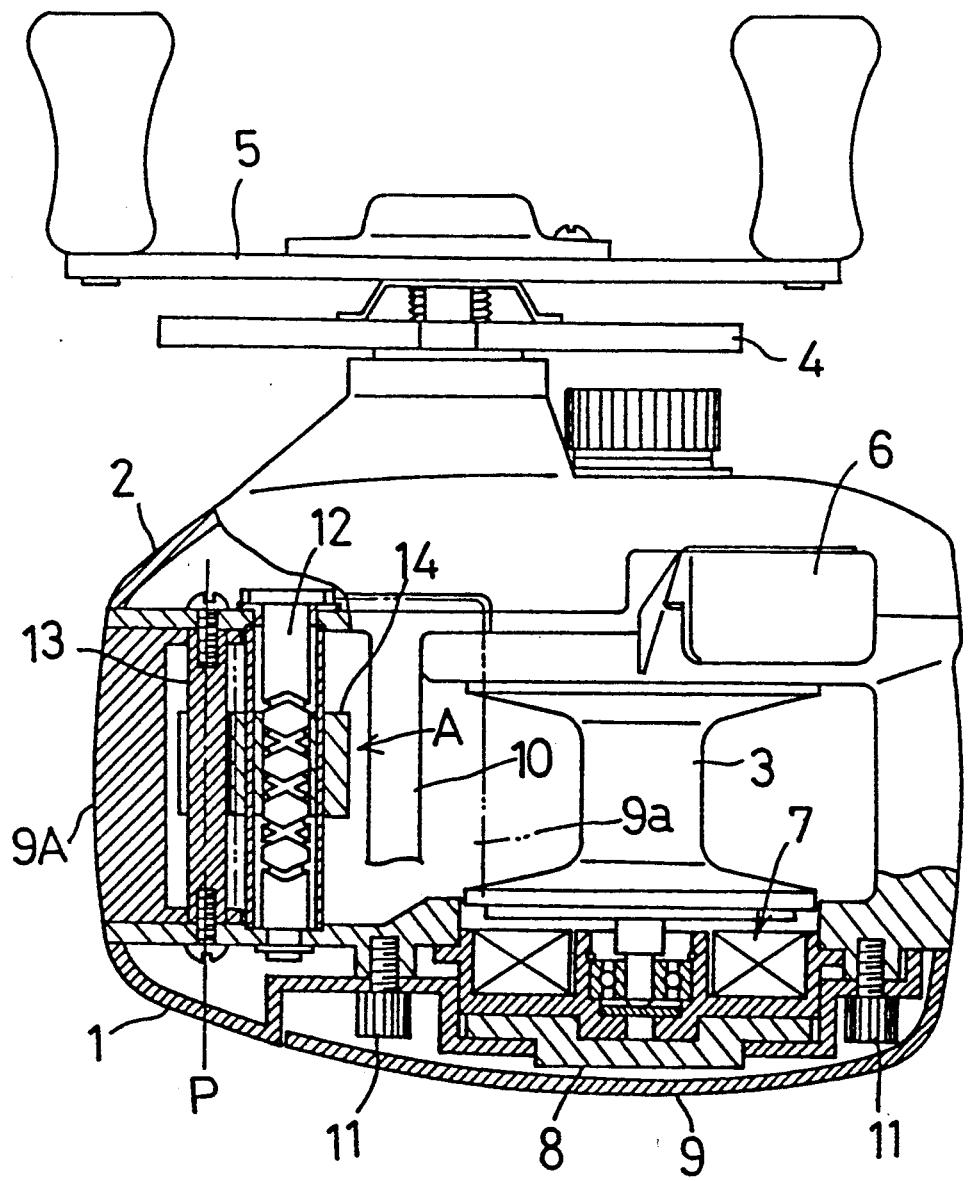
FIG. 3 is a plan view, partly in section, of the reel.
Figure 4:
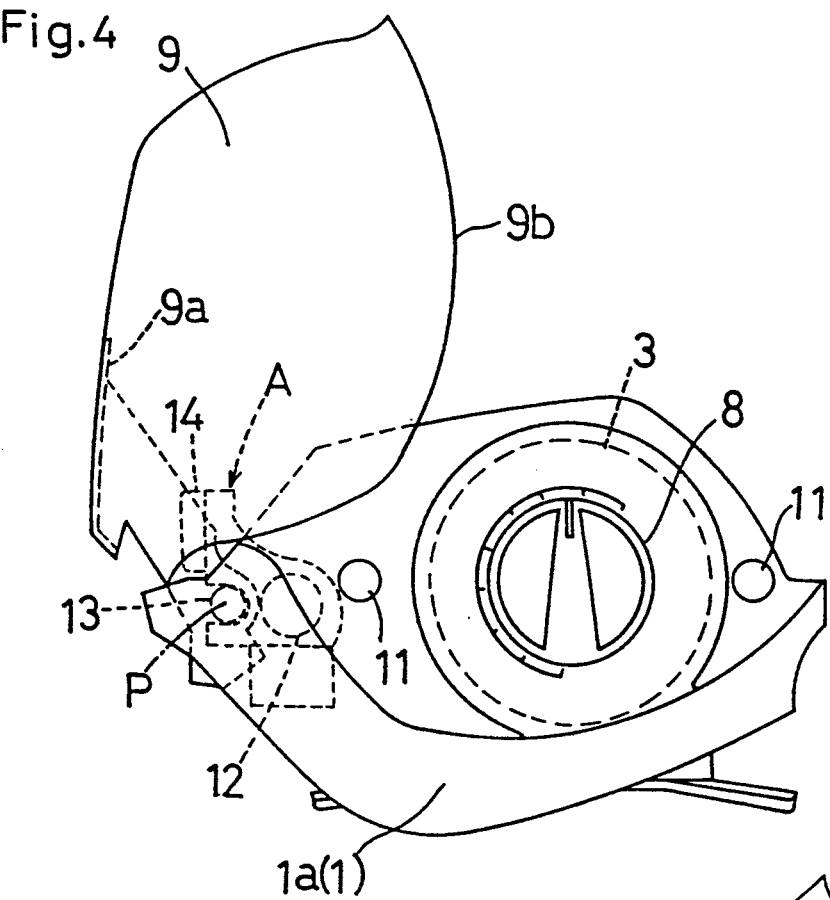
FIG. 4 is a side view of the reel with the cover opened.

As shown in FIG. 3, the right side case 2 has an upper surface including a presser 6 of a clutch (not shown) for rendering the spool 3 freely rotatable. The left side case 1 includes a dial 8 for adjusting a braking device 7 which acts on the spool 3, and a plastic cover 9 for covering lateral and top regions of the dial 8.

The cover 9 is pivotable on a transverse axis P between an open position and a closed position. The cover 9 is releasably maintained in the closed position by an engaging means 9c. A wide thumb rest 9a is formed continuous with the cover 9 to cover an upper surface of a frame 10 extending between the right and left side cases 1 and 2. The cover 9 includes a transparent portion which, when the cover is closed, is located outwardly of the dial 8 to allow visual confirmation of a dial setting state.

The braking device 7 comprises a magnet type (whose specific construction is omitted) which may be dissembled by removing bolts 11 disposed adjacent the dial 8.

Figure 5:
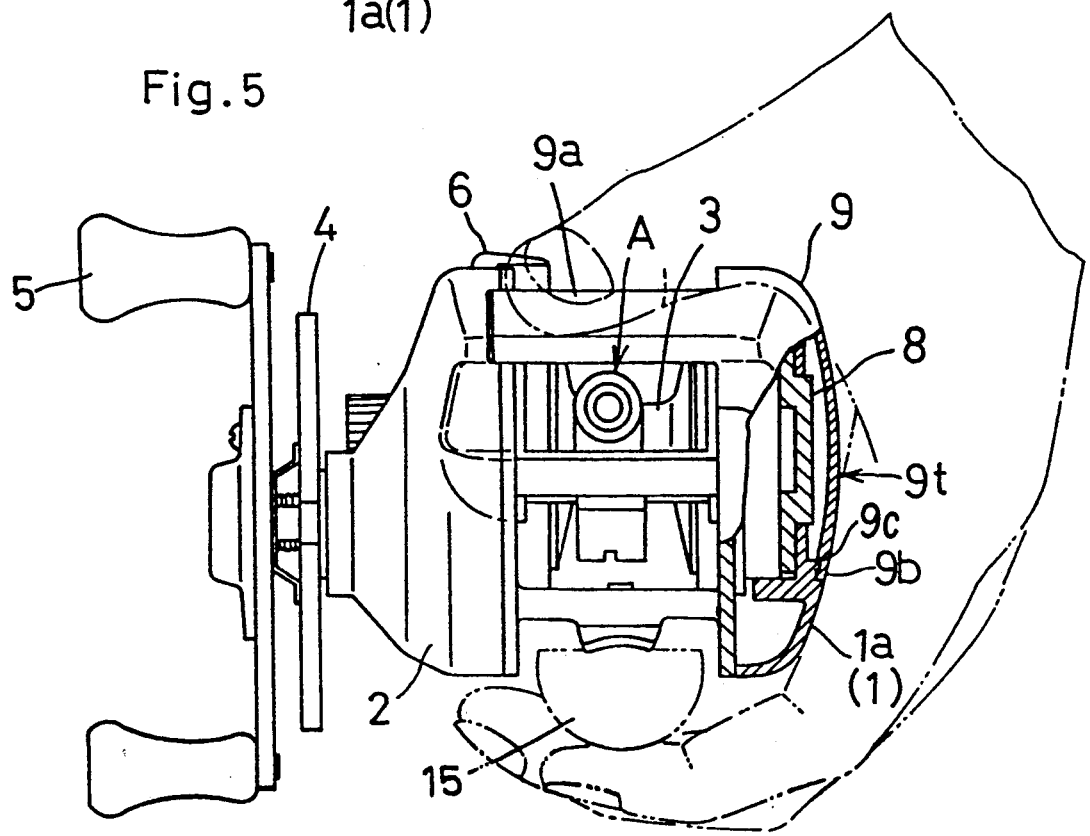
FIG. 5 is a front view of the reel in use.

As shown in FIG. 5, the cover 9 includes a bulge 9t gently swelling out at an intermediate position between an upper end and a lower edge 9b. The left side case 1 includes a curved wall 1a forming a smooth continuation with the lower edge 9b of the cover 9 in the closed position. Preferably, the cover 9 extends to a lower region of the side case 1, assuming that the side case 1 includes an upper region and a lower region across an intermediate position thereof opposed to the spool 3.

The level wind mechanism A includes a rotatable screw shaft 12, a guide rod 13, and a line guide 14 held against rotation and movable right and left by rotation of the screw shaft 12. The guide rod 13 carries an element 9A pivotable with the cover 9, and hence the transverse axis P on which the cover 9 is pivotable is coaxial with the guide rod 13.

In fishing with this reel attached to a fishing rod 15, the angler holds the reel and the fishing rod 15 with the cover 9 fitted in his palm as shown in FIG. 5. In this condition, the angler can control the fishing rod 15 with ease. The dial 8 may be operated and the bolts 11 may be removed when the cover 8 is opened. Since the thumb rest 9a is raised at this time, the fishing line may easily be passed through the line guide 14 for initially taking up the line onto the spool 3. In addition, entanglement of the line on the spool 3 due to a backlash may be straightened out with ease.

Figure 6:
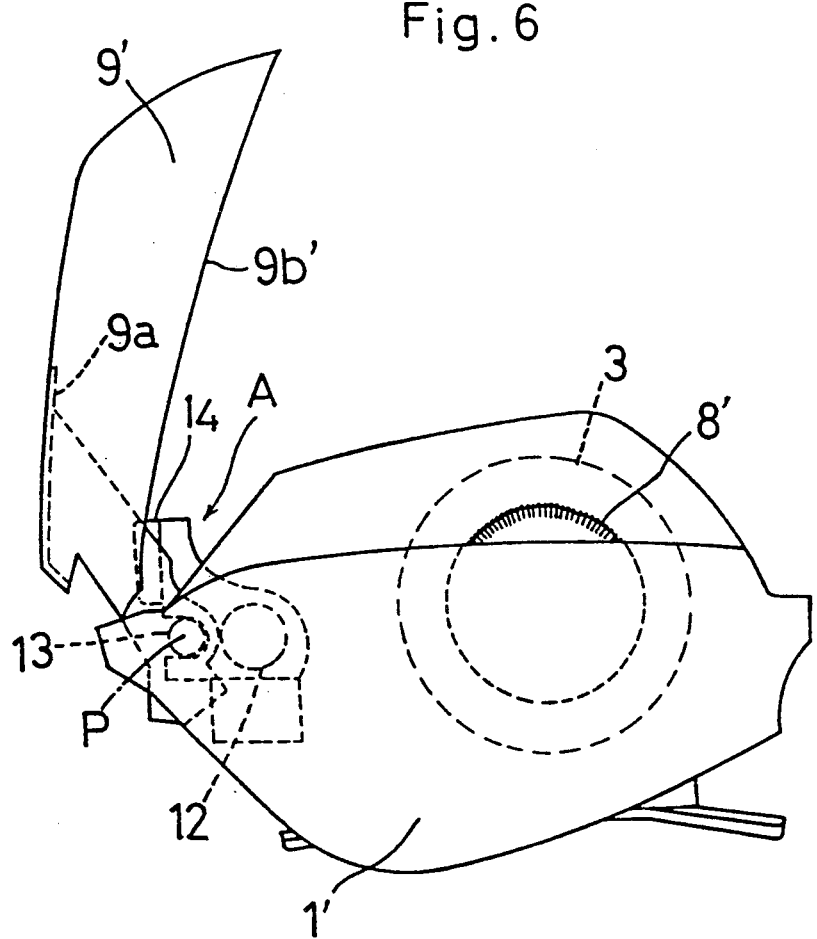
FIG. 6 is a view corresponding to FIG. 4 and showing a second embodiment.

A second embodiment of the present invention will be described next with reference to FIG. 6. In this embodiment, a brake adjusting dial 8' is mostly covered by a side case 1' and partly exposed from an upper end thereof to be covered by a cover 9'. The side case 1' includes a curved portion under a lower edge 9b' of the cover 9' to continue smoothly with a curved outer surface of the cover 9' as in the first embodiment. Thus, the angler may hold the reel with a feeling of fitness. The lower edge 9b' of the cover 9' may lie above the center of the spool 3 as shown, or may extend to a position below the center of the spool 3.

Figure 7:
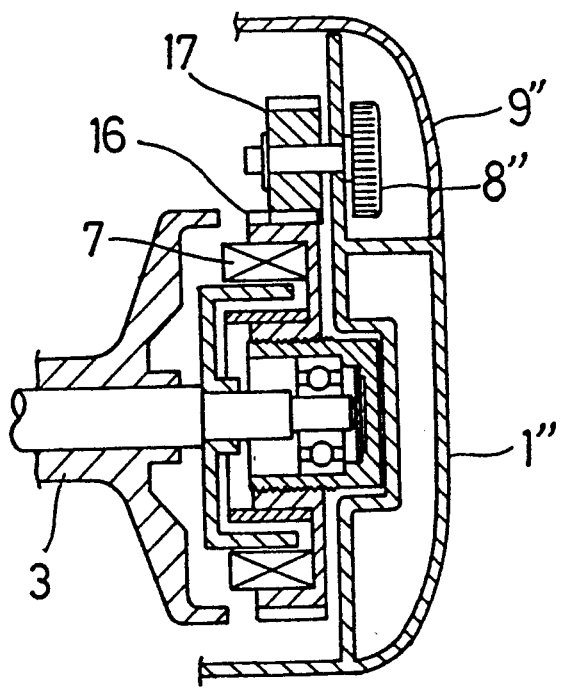
FIG. 7 is a partial view in vertical section of a third embodiment.

In a third embodiment of the present invention, as shown in FIG. 7, a brake adjusting dial 8" is disposed on an upper portion of a side case 1". This dial 8" is smaller than the dials in the preceding embodiments, and is fixed to a small gear 17 in mesh with a large gear 16 fixed to a brake adjusting mechanism. The dial 8" lies above the center of the spool 3, and is entirely covered by a cover 9".

The described embodiments may be modified such that a level difference is formed between the side case and the lower edge of the cover in the closed position. The cover may be shaped to extend to an upper end of the side case having the handle. The entire cover may be formed of a transparent material. Further, the cover may be shaped to cover only a portion of the dial of the braking device. The cover shape and the structure for opening and closing the cover may be modified in varied ways, e.g. the cover may be openable and closable by pivoting on an axis extending longitudinally of the reel.

What is claimed is:

1. A fishing reel, comprising:

first and second side cases;

a spool shaft, and a spool rotatably supported by said spool shaft, said spool being located between said side cases;

a handle for taking up a fishing line, said handle being disposed adjacent said second side case;

a control dial for controlling the rotation of said spool; and cover means for enclosing an outer lateral region of said first side case for enclosing at least a portion of said control dial, and a pivot shaft for supporting said cover means, said cover means being pivotable about said pivot shaft between a closed position and an open position;

wherein said pivot shaft is located between and forwardly of said first and second side cases, and wherein said pivot shaft is substantially parallel to said spool shaft;

wherein said cover means comprises a forward portion and a thumb rest, said thumb rest being formed integrally with said forward portion of said cover means and extending from said first side case toward said second side case;

wherein said control dial is completely enclosed by said cover means and said first side case when said cover means is in said closed position, and wherein said cover means and said first side case define a smooth surface with a bulge swelling out at a vertical intermediate position of said reel; and wherein said cover means has a lower edge which is positioned so as not to contact said control dial when said cover means is pivoted between said open and closed positions.

2. A fishing reel as claimed in claim 1, wherein said cover means extends downwardly past a vertical mid portion of said first side case, and wherein said bulge is located above said lower edge of said cover means.

3. A fishing reel as claimed in claim 2, wherein said first side case and said lower edge of said cover means comprise engaging means for maintaining said cover means in said closed position, and wherein said lower edge of said cover means has a curved shape as viewed along the axis of said spool shaft.

4. A fishing reel as claimed in claim 3, wherein at least a portion of said cover means is transparent to permit viewing of said dial when said cover means is in said closed position.

5. A fishing reel as claimed in claim 1, further comprising:

a fishing line guide (14); and a rotatable screw shaft (12) mounted between and forwardly of said first and second side cases for laterally moving said fishing line guide;

wherein said pivot shaft (13) serves as a guide rod for preventing rotation of said fishing line guide.

6. A fishing reel as claimed in claim 5, wherein said first side case and said lower edge of said cover means comprise engaging means for maintaining said cover means in said closed position, and wherein said lower edge of said cover means has a curved shape as viewed along the axis of said spool shaft.

* * * * *